United States Patent
Siegers et al.

(10) Patent No.: US 9,790,297 B2
(45) Date of Patent: *Oct. 17, 2017

(54) AZIDATED COPOLYMERS AND PROCESSES FOR PREPARING SAME

(71) Applicants: ARLANXEO Deutschland GmbH, Dormagen (DE); UNIVERSITY OF WATERLOO, Waterloo (CA)

(72) Inventors: Conrad Siegers, London (CA); Dana Adkinson, London (CA); Gregory J. E. Davidson, London (CA); Lorenzo Ferrari, Brights Grove (CA); Mario Gauthier, Waterloo (CA)

(73) Assignees: ARLANXEO Deutschland GmbH, Dormagen (DE); The University of Waterloo, Waterloo (CA)

( * ) Notice: Subject to any disclaimer, the term of this patent is extended or adjusted under 35 U.S.C. 154(b) by 60 days.

This patent is subject to a terminal disclaimer.

(21) Appl. No.: 14/364,317

(22) PCT Filed: Dec. 21, 2012

(86) PCT No.: PCT/CA2012/001193
§ 371 (c)(1),
(2) Date: Jun. 11, 2014

(87) PCT Pub. No.: WO2013/091086
PCT Pub. Date: Jun. 27, 2013

(65) Prior Publication Data
US 2014/0371399 A1  Dec. 18, 2014

Related U.S. Application Data
(60) Provisional application No. 61/579,513, filed on Dec. 22, 2011.

(51) Int. Cl.
C08F 8/30 (2006.01)
C08F 36/16 (2006.01)
(Continued)

(52) U.S. Cl.
CPC ............... *C08F 36/16* (2013.01); *C08F 8/20* (2013.01); *C08F 8/30* (2013.01); *C08F 210/12* (2013.01);
(Continued)

(58) Field of Classification Search
CPC .................................. C08F 36/16; C08F 8/30
See application file for complete search history.

(56) References Cited

U.S. PATENT DOCUMENTS 2,356,128 A  8/1944 Thomas et al.
4,916,180 A  4/1990 Robinson et al.
(Continued)

FOREIGN PATENT DOCUMENTS

WO  WO0032650 A1  6/2000
WO  WO 2009130233 A1 * 10/2009 .......... C08F 293/005

OTHER PUBLICATIONS

Ullmann's Encyclopedia of Industrial Chemistry, vol. A23, Rubber, 3, Synthetic, 1993, VCH Verlag, Weinheim, Germany, pp. 288-295.
(Continued)

*Primary Examiner* — Mark Kaucher

(57) ABSTRACT

The present invention relates to functionalized copolymers of isoolefins and olefinic monomers, particularly to azidated copolymers. The present invention also relates to methods of preparing such azidated copolymers. The functionalized copolymers are used in various technology areas such as surface modification, adhesion, drug delivery, compatibilization of polymer blends or motor oil and fuel additives, and in providing clean cured products without contaminant leaching and/or side products.

44 Claims, 1 Drawing Sheet

(51) Int. Cl.
*C08F 8/20* (2006.01)
*C08F 210/12* (2006.01)

(52) U.S. Cl.
CPC ...... *C08F 2800/10* (2013.01); *C08F 2810/50* (2013.01)

(56) References Cited

U.S. PATENT DOCUMENTS

| | | | |
|---|---|---|---|
| 5,013,793 | A | 5/1991 | Wang et al. |
| 5,182,333 | A | 1/1993 | Powers et al. |
| 6,960,632 | B2 | 11/2005 | Kaszas |
| 7,446,151 | B2 | 11/2008 | Resendes et al. |
| 2007/0203306 | A1 | 8/2007 | Resendes et al. |
| 2010/0069578 | A1 | 3/2010 | Faust et al. |
| 2011/0045030 | A1* | 2/2011 | Desai ............... A61L 27/16 424/400 |
| 2011/0124819 | A1 | 5/2011 | Hoelzl et al. |
| 2014/0336336 | A1* | 11/2014 | Siegers ............... C08J 3/24 525/342 |

OTHER PUBLICATIONS

Morton, Maurice, Butyl and Halobutyl Rubbers, Rubber Technology, Third Edition, 1987, Van Nostrand Reinhold company, Inc., New York, pp. 297-300.

Ojha, Umaprasana, et al., "A New General Methodology for the Syntheses of End-Functional Polyisobutylenes by Nucleophilic Substitution Reactions", Macromolecules 2008, 41, American Chemical Society, Washington, DC, pp. 3832-3841.

Temel, Gokhan, et al., "Synthesis and Characterization of One-Component Polymeric Photoinitiator by Simultaneous Double Click Reactions and Its Use in Photoinduced Free Radical Polymerization", Macromolecules, 2009, 42, American Chemical Society, Washington, DC, pp. 6098-6106.

International Search Report from International Application No. PCT/CA2012/001193, dated Apr. 2, 2013, 2 pages.

Supplementary European Search Report from European Application No. EP12858721, dated Nov. 11, 2015, 2 pages.

* cited by examiner

AZIDATED COPOLYMERS AND PROCESSES FOR PREPARING SAME

FIELD OF THE INVENTION

The present invention relates generally to functionalization of polymers, particularly to copolymers functionalized with azide group, and a process of preparing the same.

BACKGROUND

Butyl rubber is understood to be a copolymer of an isoolefin and at least one copolymerizable monomer. Commercial butyl rubbers comprise a major portion of isoolefin and a minor amount, usually not more than 2.5 mol %, of a conjugated multiolefin. One example of butyl rubber is poly(isobutylene-co-isoprene), or IIR, which has been prepared since the 1940's through the random cationic copolymerization of isobutylene with small amounts of isoprene.

Butyl rubber is generally prepared in a slurry process using methyl chloride as a diluent and a Friedel-Crafts catalyst as part of the polymerization initiator. This process is further described in U.S. Pat. No. 2,356,128 and Ullmann's Encyclopedia of Industrial Chemistry, volume A 23, 1993, pages 288-295.

Canadian Patent No. 2,418,884 and Canadian Patent Application No. 2,458,741 describe the preparation of butyl rubbers which have high multiolefin content. Specifically, Canadian Patent No. 2,418,884 describes the continuous preparation of IIR with isoprene levels ranging from 3 to 8 mol %.

Functionalization of butyl rubber is of great interest due to its potential applications in technology areas such as surface modification, adhesion, drug delivery, compatibilization of polymer blends, and motor oil and fuel additives, and in providing clean cured products without contaminant leaching and/or side products.

One conventional process for functionalization of butyl rubber is halogenations to produce reactive halides. Conventional butyl rubber halogenation processes are described in, for example, Ullmann's Encyclopedia of Industrial Chemistry (5$^{th}$ completely revised Ed., edited by Elvers, et al., volume A231) and Rubber Technology (3$^{rd}$ Ed., edited by Maurice Morton, Chapter 10, particularly pp. 297-300) (Van Nostrand Reinhold Company© 1987). A further example is provided in Canadian Patent Application No. 2,575,652 entitled "Method of Halogenating Butyl Rubber Without Acid Neutralization Agents", which is incorporated herein by reference in its entirety.

In Ojha et al. *Macromolecules*, 41, 3832-3841, 2008, syntheses of end-functional polyisobutylenes (PIB), including azide-functional PIB, are disclosed. However, a maximum of one azide group is provided for each polymer chain, which limits the use of the azide-functional PIB for functionalization of the polymer.

The need exists for butyl rubber derivatives having versatile functional groups.

SUMMARY OF THE INVENTION

It is an object of the present invention to provide azidated copolymers and processes for preparing such copolymers. In accordance with an aspect of the present invention, there is provided an azidated copolymer comprising repeating units derived from at least one isoolefin monomer, and repeating units derived from at least one olefinic monomer.

In accordance with an aspect of the present invention, there is provided a process for preparing an azidated copolymer, which comprises the steps of reacting a copolymer comprising repeating units derived from at least one isoolefin monomer and repeating units derived from at least one olefinic monomer with an azidation reagent to form the azidated copolymer, wherein the azidated copolymer comprises one or more of the repeating units derived from the at least one olefinic monomer substituted with one or more azide groups.

BRIEF DESCRIPTION OF THE DRAWINGS

Having summarized the invention, embodiments thereof will now be described with reference to the accompanying figures, in which.

DETAILED DESCRIPTION

Figure 1:
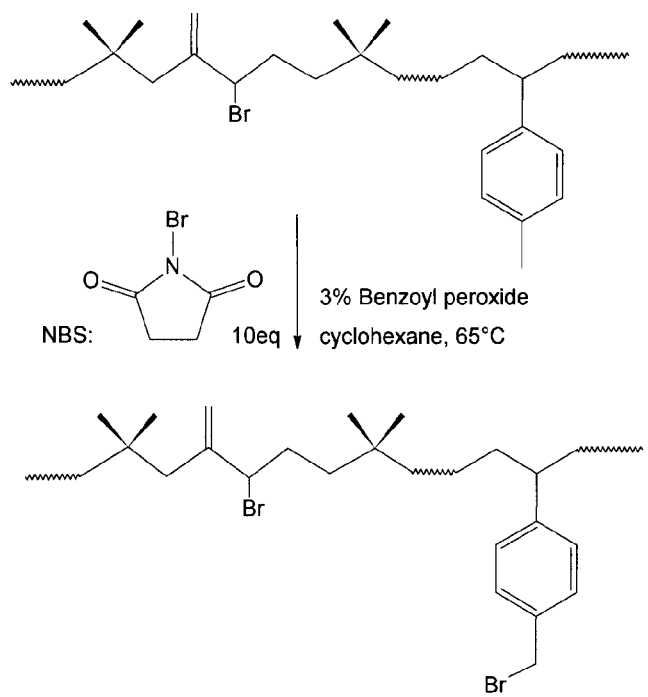
FIG. 1 shows a scheme of the bromination of TERP-10% BR of Example 9.

The present invention relates to azide group functionalized copolymers of isoolefins and one or more copolymerizable olefins, particularly olefinic monomers, and methods of preparing same.

The azidated copolymers of the present invention comprise repeating units derived from at least one isoolefin monomer and repeating units derived from at least one copolymerizable monomer, wherein one or more of the repeating units derived from the at least one copolymerizable monomer have one or more azide groups attached thereto.

In one embodiment, an azide group is linked to a carbon atom of the repeating units through a C—N single bond.

In one embodiment, the one or more repeating units comprising the azide group in the azidated copolymers is not exclusively at the end of the polymer and the average number of azide groups per copolymer chain is equal or greater than 2.

The at least one isoolefin monomer used in preparing the azidated copolymer of the present invention is not limited to a particular isoolefin. In one embodiment, the suitable isoolefins have from 4 to 7 carbon atoms, such as isobutylene, 2-methyl-1-butene, 3-methyl-1-butene, 2-methyl-2-butene, 4-methyl-1-pentene and mixtures thereof are preferred in the present invention. Particularly preferred is isobutylene.

The at least one copolymerizable monomer used in preparing the azidated copolymer of the present invention can be olefinic monomers.

In one embodiment the at least one copolymerizable monomer is a multiolefin monomer, divinyl aromatic monomer, alkyl substituted vinyl aromatic monomer, or mixtures thereof.

The multiolefin monomers used in preparing the azidated copolymers of the present invention are not limited to a particular multiolefin monomer. Suitable multiolefins have from 4 to 14 carbon atoms. Examples of such multiolefins include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene, 1-vinyl-cyclohexadiene and mixtures thereof. In one embodiment, the conjugated diene is isoprene.

Alkyl substituted vinyl aromatic monomers and divinyl aromatic monomers useful in the present invention can have an aromatic core such as benzene, naphthalene, anthracene, phenanthrene or biphenyl.

In one embodiment, the divinyl aromatic monomer used in the present invention is vinyl styrene. In one embodiment, the alkyl-substituted vinyl aromatic monomer is a $C_1$-$C_4$ alkyl substituted styrene. In one embodiment, $C_1$-$C_4$ alkyl substituted styrene includes, for example, o-methyl styrene, p-methyl styrene, or m-methyl styrene.

In one embodiment the azidated copolymer of the present invention comprises copolymers of isoolefin and a multiolefin (hereinafter referred to as isoolefin-multiolefin copolymers).

In such an embodiment, one or more of the repeating units derived from the multiolefin monomers comprise an azide moiety. In one embodiment one or more of the repeating units derived from the multiolefin monomers comprise an allylic azide moiety.

In one embodiment the azidated copolymer of the present invention comprises copolymers of isobutylene and isoprene. In one such embodiment the repeating units derived from isoprene comprise allylic azide moiety.

In one embodiment, the monomer mixture used in preparing the isoolefin-multiolefin copolymer comprises from about 80% to about 99.5% by weight of at least one isoolefin monomer and from about 0.5% to about 20% by weight of at least one multiolefin monomer. In one embodiment, the monomer mixture comprises from about 83% to about 98% by weight of at least one isoolefin monomer and from about 2.0% to about 17% by weight of a multiolefin monomer.

In one embodiment, the isoolefin-multiolefin copolymer comprises at least 0.5 mol % repeating units derived from the multiolefin monomers. In one embodiment, the repeating units derived from the multiolefin monomers are at least 0.75 mol %. In one embodiment, the repeating units derived from the multiolefin monomers are at least 1.0 mol %. In one embodiment, the repeating units derived from the multiolefin monomers are at least 1.5 mol %. In one embodiment, the repeating units derived from the multiolefin monomers are at least 2.0 mol %. In one embodiment, the repeating units derived from the multiolefin monomers are at least 2.5 mol %.

In one embodiment, the isoolefin-multiolefin copolymer comprises at least 3.0 mol % repeating units derived from the multiolefin monomers. In one embodiment, the repeating units derived from the multiolefin monomers are at least 4.0 mol %. In one embodiment, the repeating units derived from the multiolefin monomers are at least 5.0 mol %. In one embodiment, the repeating units derived from the multiolefin monomers are at least 6.0 mol %. In one embodiment, the repeating units derived from the multiolefin monomers at least 7.0 mol %.

In one embodiment, the repeating units derived from the multiolefin monomers are from about 0.5 mol % to about 20 mol %. In one embodiment, the repeating units derived from the multiolefin monomers are from about 0.5 mol % to about 8 mol %. In one embodiment, the repeating units derived from the multiolefin monomers are from about 0.5 mol % to about 4 mol %. In one embodiment, the repeating units derived from the multiolefin monomers are from about 0.5 mol % to about 2.5 mol %.

The preparation of a isoolefin-multiolefin copolymer having at least about 2.0 mol % repeating units derived from at least one multiolefin monomer is described, for example, in Canadian Patent No. 2,418,884, which is incorporated herein by reference in its entirety.

In one embodiment, the azidated copolymers of the present invention comprise copolymers of at least one isoolefin and one or more alkyl substituted aromatic vinyl monomers. In such an embodiment, one or more of the repeating units derived from the aromatic vinyl monomers comprise the azide moiety.

In one embodiment, the azidated copolymers of the present invention comprise repeating units derived from isobutylene and p-methyl styrene, wherein one or more repeating units derived from the p-methyl styrene have a benzylic azido group.

In one embodiment, the copolymers of isoolefins monomers and alkyl aromatic vinyl monomers comprise repeating units derived from the alkyl aromatic vinyl moieties from about 0.5 weight percent to about 25 weight percent of the copolymer. In one embodiment, the alkyl aromatic repeating units are from about 1 to about 20 weight percent. In one embodiment, the alkyl aromatic repeating units are from about 2 to about 10 weight percent.

In one embodiment, the azidated copolymer of the present invention comprises copolymers of isobutylene and p-methyl styrene, as described in U.S. Pat. No. 5,013,793, which is incorporated herein by reference in its entirety.

In one embodiment, the azidated copolymer of the present invention comprises copolymers of at least one isoolefin, one or more multiolefin monomers, and one or more alkyl substituted aromatic vinyl monomers. In such an embodiment, one or more units derived from the multiolefin monomers comprise an allylic azide moiety and/or one or more units derived from said the substituted aromatic vinyl monomers comprise a azide alkyl moiety.

In one embodiment, the azidated copolymer of the present invention comprises a terpolymer of isobutylene, isoprene and alkyl substituted styrene, wherein one or more repeating units derived from the isoprene have an allylic azido moiety and/or one or more repeating units derived from said p-methyl styrene have a benzylic azido group.

In one embodiment, the azidated copolymer comprises terpolymers of isobutylene, isoprene, and p-methyl styrene as described in U.S. Pat. No. 6,960,632, which is incorporated herein by reference in its entirety.

In one embodiment, the monomer mixture used in preparing the copolymer of isoolefin, the multiolefin and the alkyl substituted aromatic vinyl monomers comprise from about 80% to about 99% by weight of isoolefin monomers, from about 0.5% to about 5% by weight the multiolefin monomers, and from about 0.5% to about 15% by weight of the alkyl substituted aromatic vinyl monomers. In one embodiment, the monomer mixture comprises from about 85% to about 99% by weight of isoolefin monomer, from about 0.5% to about 5% by weight the multiolefin monomer and from about 0.5% to about 10% by weight alkyl substituted aromatic vinyl monomer.

In one embodiment, the azidated copolymer of the present invention comprises terpolymers of isobutylene, isoprene, and divinyl styrene, as described in U.S. Pat. No. 4,916,180, which is incorporated herein by reference in its entirety.

The mixture used to produce multiolefin butyl rubber polymer may further comprise a multiolefin cross-linking agent. The term cross-linking agent is a term known to persons skilled in the art and is understood to denote a compound that causes chemical cross-linking between the polymer chains as opposed to a monomer that will add to the chain. Examples of suitable cross-linking agents include norbornadiene, 2-isopropenylnorbornene, 2-vinyl-norbornene, 1,3,5-hexatriene, 2-phenyl-1,3-butadiene, divinylbenzene, diisopropenylbenzene, divinyltoluene, divinylxylene and $C_1$ to $C_{20}$ alkyl-substituted derivatives thereof. More preferably, the multiolefin cross-linking agent is divinyl-benzene, diiso-propenylbenzene, divinyltoluene, divinyl-xylene and $C_1$ to $C_{20}$ alkyl-substituted derivatives thereof, and/or mixtures of the compounds given. Most preferably, the multiolefin cross-linking agent comprises divinyl-benzene and diiso-propenylbenzene.

In one aspect of the present invention, the azidated copolymer of the present invention is a star branched copolymer linked to a branching moiety In one embodiment, the branching moiety is a polymeric branching moiety.

The polymeric branching moiety useful in the formation of the star branched polymer of the present invention includes polymers and copolymers comprising functional groups capable of copolymerizing or forming a covalent bond with the active chain end of a growing polymeric chain of the copolymer used in the formation of the halogenated polymer. The functional group comprises cationically active unsaturation. Non-limiting examples of such polymeric moieties include polydienes, partially hydrogenated polydienes, such as polybutadiene, polyisoprene, polypiperylene, natural rubber, styrene-butadiene rubber, ethylene-propylene diene monomer rubber, styrene-butadiene-styrene and styrene-isoprene-styrene block copolymers. Star branched polymers of the present invention can be prepared by first linking the polymeric chains with the branching moiety followed by halogenations of the polymeric chains. Preparation of starch branch polymers is described in U.S. Pat. No. 5,182,333 and European Publication No. 0 320 263, which are incorporated herein by reference in their entirety.

Preparation of Azidated Copolymers

The azidated copolymers of the present invention can be prepared by reacting the copolymer of at least one isoolefin and at least one copolymerizable monomer with an azidation reagent. This reaction is referred to as azidation reaction.

The azidation reagent can be an azide salt, a covalent azide compound, or mixtures thereof.

Examples of suitable covalent azide compounds include, but are not limited to, halogen azide, trimethylsilyl azide ($Me_3SiN_3$ or $TMSN_3$), p-toluene sulfonyl azide or tosyl azide ($TsN_3$), trifluoromethanesulfonyl azide and hydrogen azide ($HN_3$).

Suitable azide salts for use in the azidation reaction include both organic and inorganic azide salts, would be known and understood by persons skilled in the art. Examples of suitable azide salts include, but are not limited to, sodium azide ($NaN_3$), potassium azide ($KN_3$), ammonium azide ($NH_4N_3$), and tetraalkylammonium azide, such as, tetrabutylammonium azide ($TBAN_3$).

In one embodiment, the azidation reaction is carried out by reacting the azidation reagent with a copolymer of isoolefin and at least one copolymerizable monomer, wherein one or more of the repeating units derived from the copolymerizable monomer are functionalized with one or more oxygen containing functional groups.

In one embodiment the oxygen containing functional group is an epoxide group.

In one embodiment the copolymer comprising the epoxide group is a copolymer of at least one isoolefin monomer and one or more multiolefin monomers, or divinyl aromatic monomer, or both. Non limiting examples of these monomers are as discussed above.

In one embodiment, the azidation reaction is carried out by reacting the azidation reagent with a copolymer of isoolefin and at least one copolymerizable monomer, wherein the copolymer is functionalized with one or more leaving groups. In one embodiment, one or more of the repeating units derived from the at least one copolymerizable monomer are functionalized with the leaving group.

The leaving group can be halogen, amine, $PR_3$, ether, diazonium, oxonium, nonaflate, triflate, fluorosulfonate, tosylate, mesylate, conjugate acid of an alcohol, conjugate acid of an ether, nitrate, phosphate, $SR'_2$, ester, acid anhydride, phenoxide, alcohol, carboxylic acid, or mixtures thereof. Preferably, the leaving group is halogen, amine, $PR_3$, or mixtures thereof.

In one embodiment, substantially all of the repeating units derived from the at least one copolymerizable monomer are covalently bound to leaving groups.

In one embodiment, only some of the repeating units derived from the at least one copolymerizable monomer are covalently bound to leaving groups.

In one embodiment the copolymer comprising the leaving group is a copolymer of at least one isoolefin monomer and a multiolefin monomer, a divinyl aromatic monomer, an alkyl substituted vinyl aromatic monomer, or mixtures thereof. Non limiting examples of these monomers are as discussed above.

In one embodiment the leaving group is halogen.

In one embodiment, the halogenated copolymer used in the formation of the azide functionalized copolymer of the present invention comprises at least one allylic halogen moiety, at least one halo alkyl moiety, or both.

In one embodiment, the halogenated copolymer comprises repeating units derived from at least one isoolefin monomer and repeating units derived from one or more multiolefin monomers. In such an embodiment, one or more of the repeating units derived from the multiolefin monomers comprise an allylic halogen moiety. In one embodiment, the halogenated copolymer is halogenated butyl rubber polymer or halobutyl polymer.

In one embodiment, the halogenated polymer is obtained by first preparing a copolymer from a monomer mixture comprising one or more isoolefins and one or more multiolefins (also referred to as multiolefin butyl rubber polymer), followed by subjecting the resulting copolymer to a halogenation process to form the halogenated polymer. Halogenation can be performed according to the process known by those skilled in the art, for example, the procedures described in Rubber Technology, 3rd Ed., Edited by Maurice Morton, Kluwer Academic Publishers, pp. 297-300 and further documents cited therein.

During halogenation, some or all of the multiolefin content of the copolymer is converted to units comprising allylic halides. The total allylic halide content of the halogenated polymer cannot exceed the starting multiolefin content of the parent copolymer.

When the multiolefin butyl rubber polymer is halogenated, there may then be both allylic halides, which are derived from the original multiolefin content, and non-halogenated multiolefins present within the same polymer, especially when high multiolefin butyl rubber polymers are used as the starting material for the halobutyl polymer.

In one embodiment, the halogenated isoolefin-multiolefin copolymer may comprise at least about 0.1 mol % allylic halides and/or repeating units derived from allylic halides. In one embodiment, the halogenated isoolefin-multiolefin copolymer may comprise at least about 0.2 mol %, allylic halides and/or repeating units derived from allylic halides.

In one embodiment, the halogenated isoolefin-multiolefin copolymer may comprise at least about 0.5 mol % allylic halides and/or repeating units derived from allylic halides. In one embodiment, the halogenated isoolefin-multiolefin copolymer may comprise at least about 0.8 mol % allylic halides and/or repeating units derived from allylic halides. In one embodiment, the halogenated isoolefin-multiolefin copolymer may comprise at least about 1.0 mol % allylic halides and/or repeating units derived from allylic halides.

In one embodiment, the halogenated copolymer of the present invention comprises copolymers of at least one isoolefin and one or more alkyl substituted aromatic vinyl monomers. In such an embodiment, one or more of the repeating units derived from the aromatic vinyl monomers comprise a halo alkyl moiety.

In one embodiment, these type of halogenated polymers are obtained by first preparing a copolymer from a monomer mixture comprising one or more isoolefins and one or more alkyl substituted aromatic vinyl monomers, followed by subjecting the resulting copolymer to a halogenation process to form the halogenated polymer. During halogenation, some or all of the alkyl groups of the repeating units derived from the aromatic vinyl monomers are halogenated. In one embodiment, the halogenated polymers of the present invention comprise co-polymers of isoolefin and methyl styrene, wherein after halogenations, methyl group of some or all of the repeating units derived from the methyl styrene are converted to benzylic halides. The total benzylic halide content of the halobutyl polymer cannot exceed the starting styrenic content of the parent butyl compound.

In one embodiment, the copolymers of isoolefins monomers and alkyl aromatic vinyl monomers comprise repeating units derived from the alkyl aromatic vinyl moieties from about 0.5 weight percent to about 25 weight percent of the copolymer. In one embodiment, the alkyl aromatic repeating units are from about 1 to about 20 weight percent. In one embodiment, the alkyl aromatic repeating units are from about 2 to about 10 weight percent.

In one embodiment, the halogenated polymer of the present invention comprises copolymers of isobutylene and p-methyl styrene, as described in U.S. Pat. No. 5,013,793, which is incorporated herein by reference in its entirety. In one embodiment, the halogenated polymer of the present invention comprises copolymers of isobutylene and p-methyl styrene having styrene content from about 5% to 7% and halogen content from about 0.5 to 1.5%.

In one embodiment, the halogenated polymer of the present invention comprises copolymers of at least one isoolefin, one or more multiolefin monomers, and one or more alkyl substituted aromatic vinyl monomers. In such an embodiment, one or more units derived from the multiolefin monomers comprise an allylic halogen moiety and/or one or more units derived from the the substituted aromatic vinyl monomers comprise a halo alkyl moiety.

These type of halogenated polymers can be formed by first preparing a copolymer from a monomer mixture comprising the isoolefin, the multiolefin and the alkyl substituted aromatic vinyl monomers, followed by subjecting the resulting copolymer to halogenation process to halogenate the repeating units derived from the multiolefin monomers and/or the alkyl group of the repeating units derived from aromatic vinyl monomers.

In one embodiment, the monomer mixture used in preparing the copolymer of isolefin, the multiolefin and the alkyl substituted aromatic vinyl monomers comprise from about 80% to about 99% by weight of isoolefin monomers, from about 0.5% to about 5% by weight the multiolefin monomers, and from about 0.5% to about 15% by weight of the alkyl substituted aromatic vinyl monomers. In one embodiment, the monomer mixture comprises from about 85% to about 99% by weight of isoolefin monomer, from about 0.5% to about 5% by weight the multiolefin monomer and from about 0.5% to about 10% by weight alkyl substituted aromatic vinyl monomer.

In one embodiment, the halogenated polymer comprises terpolymers of isobutylene, isoprene, and p-methyl styrene as described in U.S. Pat. No. 6,960,632, which is incorporated herein by reference in its entirety.

In one embodiment, the amount of azidation reagent reacted with the copolymer functionalized with the leaving group or the oxygen containing functional groups to produce azidated copolymer can range from about 50 to about 0.05 molar equivalents, preferably about 15 to about 0.05 molar equivalents, more preferably about 7 to about 0.05 molar equivalents and even more preferably about 1.5 to about 0.1 molar equivalents, based on the total molar amount of functional groups in the copolymer.

The azidation reaction to synthesize azidated copolymer can be carried out in solution or in bulk (i.e. in the absence of a solvent).

When the reaction is carried out in solution, the process comprises the step of adding the starting copolymer and the azidation reagent to a solvent to form a reaction mixture.

Suitable solvents include, but are not limited to, tetrahydrofuran (THF), dichloromethane, chlorobenzene, dichlorobenzenes, toluene and chloroform. The addition of a second solvent to the reaction mixture, such as N,N-dimethylformamide (DMF), can be used to facilitate the solubilization of the azidation reagent and it is particularly helpful to add DMF when using $NaN_3$. Persons skilled in the art would know how to control the ratio between the first solvent and the additional second solvent to avoid unwanted polymer precipitation.

In one embodiment, the reaction between the starting copolymer and the azidation reagent is carried out in bulk using conventional mixers. Examples of suitable mixers include, but are not limited to, a Banbury mixer, a miniature internal mixer (such as a Haake or Brabender mixer), a two roll mill mixer, and extruders (such as single screw and twin screw extruders).

In one embodiment, when the azidation reaction is carried out in solution, the starting copolymer can be present in an amount of at least about 0.5%, preferably at least about 2%, more preferably at least about 4%, and even more preferably at least about 10% by weight of the reaction mixture.

In one embodiment the azidation reaction is carried out at room temperature and in solution.

Without limitation to a particular hypothesis, it is considered that the synthesis of azidated copolymer, when a halogenated copolymer is reacted with an azidation reagent (such as azide salt), proceeds by nucleophilic displacement of a halogen atom by the azido group derived from the azidation reagent. Without limitation to a particular hypothesis, it is considered that when the halogenated copolymer polymer is a terpolymer of which the units derived from two different monomers are halogenated, the nucleophilic displacement may occur only to the halogens of the halogenated units derived from one monomer.

In one embodiment, azidated and non-azidated units may both be present in the same azidobutyl polymer.

The invention will now be described with reference to specific examples. It will be understood that the following examples are intended to describe embodiments of the invention and are not intended to limit the invention in any way.

EXAMPLES

The Examples use common equipment and materials as following unless otherwise specified.

$^1$H NMR spectra were recorded with a Bruker 300 MHz or 500 MHZ spectrometer in $CDCl_3$ unless otherwise mentioned. Chemical shifts were referenced to tetramethylsilane.

FT-IR spectra were acquired on a Bruker Vector 22 FT-IR spectrophotometer. Spectra were acquired from 700 to 4000 $cm^{-1}$ with a resolution of 1 $cm^{-1}$ and a total of 16 scans per spectrum. Thin films were deposited on a NaCl plate from a 2% sample solution and the analysis was performed after complete evaporation of the solvent.

Cyclohexane (Caledon, reagent grade) was purified by refluxing with oligostyryllithium under nitrogen ($N_2$) atmosphere.

Other chemicals were used as received from the suppliers: deuterated chloroform ($CDCl_3$), 99.8%, Cambridge Isotope Laboratories; allyl bromide, 99%, Aldrich; zinc chloride, 98%, BDH Chemicals; N-bromosuccinimide, >95%, Fluka; benzoyl peroxide, 99%.

The experimental butyl rubbers, used as supplied by LANXESS Inc., were resulted from different levels of bromination of a copolymer of isobutylene and isoprene with 5.3 mol % isoprene units, such that active bromine levels of 2.3 mol %, 3.3 mol % and 4.3 mol % were obtained respectively. Terpolymer TERP-10% BR was used as supplied by LANXESS Inc. and is a copolymer of isobutene, isoprene and p-methylstyrene containing 1.2 mol % brominated isoprene units and 10 mol % methylstyrene. The commercial butyl rubbers used were LANXESS Bromobutyl 2030, with an active bromine level of 0.85 mol %. Sodium azide ($NaN_3$), tetrabutylammonium azide ($TBAN_3$), tetrahydrofuran (THF) and N,N-dimethylformamide (DMF) were ordered from Aldrich and used as received.

BIMS1 and BIMS3 are brominated copoylmers of isobutylene and methyl styrene. BIMS1 has styrene content of 5%, a bromide content of 0.5%, and a Mooney viscosity of 45. BIMS3 has styrene content of about 7%, a bromide content of about 1.2%, and a Mooney viscosity of 45.

Examples 1 to 19

Azidation Reactions of Brominated Butyl Rubber Polymers with Azidation Salts

The experimental details for Examples 1 to 19 are summarized in Table 1 below. The respective butyl rubber polymer was dissolved in THF or $CDCl_3$. The second solvent, DMF, was added to specific Examples as indicated. Then, the azide salt ($NaN_3$ or $TBAN_3$) was added and the mixture was stirred or shaken for the indicated time at room temperature. Then, the resulting azidobutyl in the mixture was precipitated via the addition of ethanol and was purified by 2 more dissolution/precipitation steps and further dried under vacuum. When more than 15 g of azidobutyl was obtained, the azidobutyl was dried at 80° C.-100° C. by calendaring on a 2-roll mill. The conversion percentages were calculated from $^1$H NMR data as the ratio between the mol % of the allylic azide groups of the resulting azidobutyl and the mol % of the allylic bromides in the starting butyl rubber polymer.

Characterization

The resulting products were characterized by $^1$H NMR and IR spectroscopy. For example, the exo-allylic bromide unit in BB2030 generates peaks at 5.40, 5.03 and 4.35 ppm. As these units react with the azide anion, these peaks decrease in intensity. In case of BB2030, the peaks at 5.18 (s), 5.04 (s) and 3.65 (two overlapping t, appearing as dt) ppm indicated the formation of an exo-allylic $N_3$ unit. There is further $^1$H NMR evidence for the formation of endo-allylic $N_3$ units in an E and Z configuration. These units generate signals at 5.54 (t), 5.47 (t), 3.81 (s) and 3.71 (s) ppm. Signals that are assigned to non-halogenated olefinic units are unaffected by the azide substitution reaction (i.e. t at 5.07 ppm for 1,4-isoprenyl unit and d for the branched unit at 4.93 ppm). Conversion of benzylic bromide units to benzylic azide units is reflected in $^1$H NMR spectra by a decrease in signal intensity for Ar—$CH_2$Br at 4.5. ppm and the occurrence of a novel signal at 4.3 ppm, which is in consistence with the formation of Ar—$CH_2$—$N_3$.

TABLE 1

| Example # | Butyl-grade type | mol % Br | mol % IP | mol % MS | Azide | Solv. 1 type | m [g] | opt. Solv. 2 type | m [g] | $m_{N3}$ [g] | $m_{BIIR}$ [g] | eq. $N_3$ | t [d] | conversion |
|---|---|---|---|---|---|---|---|---|---|---|---|---|---|---|
| 1 | experimental | 4.0% | 1.2% | | $NaN_3$ | THF | 80.0 | DMF | 9.4 | 0.44 | 1.00 | 10.0 | 4 | 87% |
| 2 | experimental | 3.3% | 1.9% | | $NaN_3$ | THF | 80.0 | DMF | 9.4 | 0.36 | 1.00 | 10.1 | 4 | 84% |
| 3 | experimental | 2.3% | 3.0% | | $NaN_3$ | THF | 80.0 | DMF | 9.4 | 0.25 | 1.00 | 9.9 | 4 | 100% |
| 4 | BB2030 | 0.85% | 0.60% | | $TBAN_3$ | THF | 16.45 | | | 0.143 | 0.493 | 6.85 | 4 | 95% |
| 5 | BB2030 | 0.85% | 0.60% | | $NaN_3$ | THF | 46.30 | DMF | 6.6 | 0.13 | 2.10 | 6.39 | 4 | 76% |
| 6 | BB2030 | 0.85% | 0.60% | | $NaN_3$ | THF | 31.15 | DMF | 4.7 | 0.10 | 1.01 | 10.24 | 4 | 76% |
| 7 | BB2030 | 0.85% | 0.60% | | $TBAN_3$ | THF | 680 | | | 2.50 | 40.6 | 1.45 | 2 | 99% |
| 8 | BB2030 | 0.85% | 0.60% | | $TBAN_3$ | $CDCl_3$ | 2.25 | | | 0.006 | 0.04 | 3.68 | 1.5 | 95% |
| 9 | BB2030 | 0.85% | 0.60% | | $TBAN_3$ | THF | 1913.9 | | | 11.2 | 241 | 1.10 | 1 | 100% |
| 10 | BB2030 | 0.85% | 0.60% | | $TBAN_3$ | THF | 235 | | | 0.653 | 21.8 | 0.71 | 1 | 67% |
| 11 | BB2030 | 0.85% | 0.60% | | $TBAN_3$ | THF | 175 | | | 0.645 | 17.9 | 0.85 | 1 | 80% |
| 12 | BB2030 | 0.85% | 0.60% | | $TBAN_3$ | THF | 956 | | | 6.38 | 111 | 1.36 | 1 | 100% |
| 13 | BB2030 | 0.85% | 0.60% | | $TBAN_3$ | THF | 1335 | | | 13 | 250 | 1.23 | 0.8 | 94% |
| 14 | BIMS1 | 0.51% | | 2.34% | $TBAN_3$ | THF | 133.38 | | | 0.74 | 25 | 1.20 | 0.8 | 81% |
| 15 | BIMS3 | 1.17% | | 3.06% | $TBAN_3$ | THF | 133.38 | | | 1.72 | 25.16 | 1.25 | 0.8 | 92% |
| 16 | BB2030 | 0.86% | 0.72% | | $TBAN_3$ | THF | 1333.8 | | | 12.9 | 250 | 1.20 | 0.8 | 105% |
| 17 | BB2030 | 0.84% | 0.72% | | $TBAN_3$ | THF | 1333.8 | | | 3.233 | 250 | 0.31 | 0.8 | 37% |
| 18 | BBX2 | 0.85% | 0.62% | | $TBAN_3$ | THF | 1333.8 | | | 10.9 | 250 | 1.03 | 0.2 | 85% |

TABLE 1-continued

| Example # | Butyl-grade type | mol % Br | mol % IP | mol % MS | Azide | Solv. 1 type | m [g] | opt. Solv. 2 type | m [g] | $m_{N3}$ [g] | $m_{BIIR}$ [g] | eq. $N_3$ | t [d] | conversion |
|---|---|---|---|---|---|---|---|---|---|---|---|---|---|---|
| 19 | BB2030 | 0.84% | 0.72% | | TBAN$_3$ | THF | 1333.8 | | | 12.9 | 250 | 1.23 | 0.2 | 106% |
| 21 | Terpolymer | | | | NaN$_3$ | THF | 80.0 | DMF | 9.4 | 1.03 | 1.00 | 10.0 | 3 | 75% |

Example 20

Halogenation of Butyl Rubber Terpolymer 1 g TERP-10% BR (10% p-methyl styrene and 1.2 mol % brominated isoprene units=1.58×10$^{-3}$ mol p-methyl styrene units) was dried overnight under vacuum before it was dissolved in 100 mL of dry, freshly distilled cyclohexane. The solution was heated to 65° C., and 3% benzoyl peroxide (12 mg) and 10 equiv N-bromosuccinimide (2.81 g) were added. After 6 h, the polymer solution was concentrated to 50 mL and precipitated in 300 mL of cold methanol (0° C.). The polymer was further purified with two additional cycles of dissolution in 50 mL of THF and precipitation in 300 mL of methanol. The polymer obtained was finally dissolved in chloroform and dried before NMR analysis. The NMR analysis indicated quantitative bromination of the methyl groups of the p-methyl styrene units. The scheme of the bromination of TERP-10% BR of Example 9 is depicted in FIG. 1

Example 21

Azidation of Halogenated Butyl Rubber Terpolymer of Example 20

Figure 2:
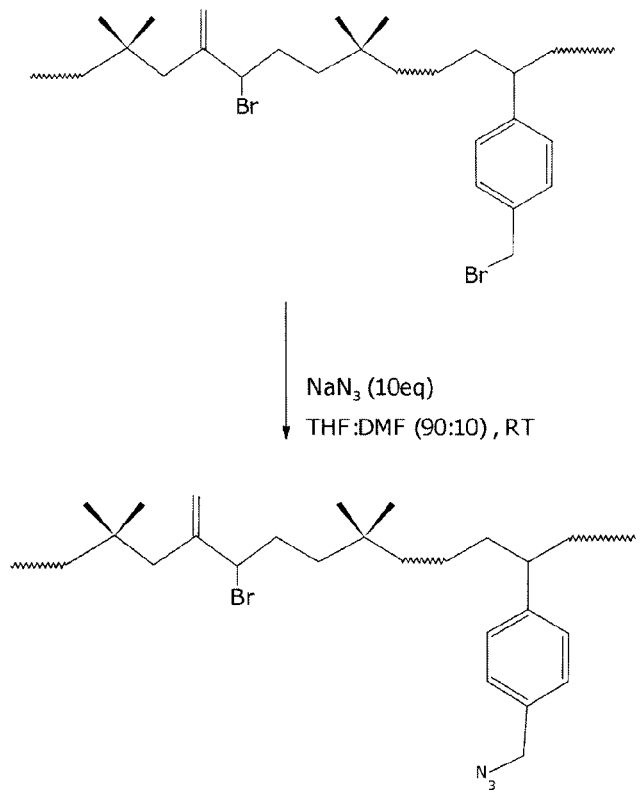
FIG. 2 shows a scheme of the azidation of the fully brominated TERP-10% BR of Example 10.

1 g fully brominated terpolymer of Example 9 was dissolved in 90 mL of dry, freshly distilled THF. Once the polymer was dissolved, 10 mL of DMF and 10 equiv sodium azide (1.03 g) were added to the mixture. The reaction was stirred at room temperature until the reaction was complete as monitored by $^1$H NMR spectroscopy. The polymer solution was worked up as outlined in Example 1. A conversion of 75% of the original bromide to azide group was achieved as determined by NMR analysis. The scheme of the azidation of the fully brominated TERP-10% BR of Example 10 is depicted in FIG. 2

All documents cited in the Detailed Description of the Invention are, in relevant part, incorporated herein by reference; the citation of any document is not to be construed as an admission that it is prior art with respect to the present invention.

While particular embodiments of the present invention have been illustrated and described, it would be appreciated by those skilled in the art that various other changes and modifications can be made without departing from the scope of the invention. It is therefore intended to cover in the appended claims all such changes and modifications that are within the scope of this invention.

What is claimed is:

1. A bulk material comprising azidated copolymer, the azidated copolymer comprising copolymer chains comprising:
   a) repeating units derived from at least one isoolefin monomer; and
   b) repeating units derived from at least one olefinic monomer,
   wherein one or more of the repeating units derived from the at least one olefinic monomer have one or more azide groups attached through a C—N single bond, and
   wherein:
      the copolymer chains have chain ends and repeating units derived from at least one olefinic monomer that are not chain ends, and one or more of the repeating units comprising an azide group is a repeating unit that is not a chain end; and
      each copolymer chain in the bulk material has at least one azide group, and the copolymer chains in the bulk material have an average number of azide groups per copolymer chain equal to or greater than 2.

2. The bulk material of claim 1, wherein the at least one olefinic monomer is selected from the group consisting of multiolefin monomers, alkyl substituted vinyl aromatic monomers and combinations thereof.

3. The bulk material of claim 2, wherein the azidated copolymer comprises at least one of an allylic azido moiety and an azido alkyl moiety.

4. The bulk material of claim 2, wherein the repeating units derived from the at least one olefinic monomer comprise repeating units derived from at least one multiolefin monomer.

5. The bulk material of claim 4, wherein:
   the multiolefin monomer is a $C_4$-$C_{14}$ multiolefin monomer; and
   one or more of the repeating units derived from at least one multiolefin monomer comprise an allylic halogen moiety.

6. The bulk material according to claim 4 or 5, wherein the multiolefin monomer is isoprene, butadiene, 2-methyl-butadiene, 2,4-dimethylbutadiene, piperylene, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-hepta-diene, cyclopentadiene, methylcyclopentadiene, cyclohexadiene, 1-vinyl-cyclohexadiene, or mixtures thereof.

7. The bulk material according to claim 4 or 5, wherein the multiolefin monomer is isoprene.

8. The bulk material of claim 4, further comprising one or more repeating units derived from at least one divinyl aromatic monomer.

9. The bulk material of claim 2, wherein the at least one olefinic monomer comprises at least one alkyl substituted aromatic vinyl monomer.

10. The bulk material of claim 9, wherein one or more repeat units derived from alkyl substituted aromatic vinyl monomer comprises an azido alkyl moiety.

11. The bulk material of claim 2, wherein the at least one olefinic monomer comprises at least one multiolefin monomer, and at least one alkyl substituted aromatic vinyl monomer.

12. The bulk material of claim 11, wherein one or more units derived from multiolefin monomer comprise an allylic azide moiety and/or one or more units derived from alkyl substituted aromatic vinyl monomers comprise an azido alkyl moiety.

13. The bulk material of claim 9, wherein the alkyl substituted aromatic vinyl monomer is $C_1$-$C_4$ alkyl substituted styrene.

14. The bulk material of claim 13, wherein the $C_1$-$C_4$ alkyl substituted styrene is o-methyl styrene, p-methyl styrene, m-methyl styrene, or a mixture thereof.

15. The bulk material according to claim 11 or 14, wherein the multiolefin monomer is isoprene.

16. The bulk material according to claim 1, wherein the at least one isoolefin monomer is a $C_4$-$C_7$ isoolefin monomer.

17. The bulk material of claim 16, wherein the $C_4$-$C_7$ isoolefin monomer is isobutylene, 2-methyl-1-butene, 3-methyl-1-butene, 2-methyl-2-butene, 4 methyl-1-pentene, or a mixture thereof.

18. The bulk material of claim 1, wherein the at least one isoolefin monomer comprises isobutylene, the at least one olefinic monomer comprises isoprene, and one or more repeating units derived from isoprene have an allylic azido moiety.

19. The bulk material of claim 1, further comprising one or more repeating units derived from divinyl benzene.

20. The bulk material of claim 1, wherein the at least one isoolefin monomer comprises isobutylene, the at least one olefinic monomer comprises p-methyl styrene, and one or more repeating units derived from p-methyl styrene have a benzylic azido group.

21. The bulk material of claim 1, wherein the copolymer comprises a terpolymer of isobutylene, isoprene and p-methyl styrene, wherein one or more repeating units derived from isoprene have an allylic azido moiety and/or one or more repeating units derived from p-methyl styrene have a benzylic azido group.

22. A bulk material comprising azidated copolymer, the azidated copolymer comprising copolymer chains comprising:
 a) repeating units derived from at least one isoolefin monomer; and
 b) repeating units derived from at least one olefinic monomer, wherein about 20% to about 100% of the repeating units derived from at least one olefinic monomer comprise attached azide groups attached through a C—N single bond, and
 wherein:
 the copolymer chains have chain ends and repeating units derived from at least one olefinic monomer that are not chain ends, and one or more of the repeating units comprising an azide group is a repeating unit that is not a chain end; and
 each copolymer chain in the bulk material has at least one azide group, and the copolymer chains in the bulk material have an average number of azide groups per copolymer chain equal to or greater than 2.

23. The bulk material of claim 1, wherein one or more of the repeating units comprise at least one leaving group or an oxygen containing functional group.

24. A bulk material comprising azidated copolymer, wherein the azidated copolymer is a star branched polymer comprising copolymer chains comprising:
 a) repeating units derived from at least one isoolefin monomer; and
 b) repeating units derived from at least one olefinic monomer,
 wherein one or more of the repeating units derived from the at least one olefinic monomer have one or more azide groups attached through a C—N single bond, and
 wherein:
 the copolymer chains have chain ends and repeating units derived from at least one olefinic monomer that are not chain ends, and one or more of the repeating units comprising an azide group is a repeating unit that is not a chain end; and
 each copolymer chain in the bulk material has at least one azide group, and the copolymer chains in the bulk material have an average number of azide groups per copolymer chain equal to or greater than 2.

25. A process for preparing bulk azidated copolymer, the process comprising contacting
 a copolymer comprising copolymer chains of repeating units derived from at least one isoolefin monomer and repeating units derived from at least one olefinic monomer; and
 an azidation reagent
 to form bulk azidated copolymer comprising copolymer chains, wherein:
 in the copolymer chains, one or more of the repeating units derived from the at least one olefinic monomer have one or more azide groups attached through a C—N single bond,
 the copolymer chains have chain ends and repeating units derived from at least one olefinic monomer that are not chain ends, and one or more of the repeating units comprising an azide group is a repeating unit that is not a chain end; and
 each copolymer chain in the bulk azidated copolymer has at least one azide group, and the copolymer chains in the bulk azidated copolymer have an average number of azide groups per copolymer chain equal to or greater than 2.

26. The process according to claim 25, wherein the azidation reagent is an azide salt, a covalent azide compound, or a mixture thereof.

27. The process according to claim 26, wherein the azidation reagent is an azide salt selected from the group consisting of $NaN_3$, $KN_3$, $NH_4N_3$ and $TBAN_3$.

28. The process according to claim 26, wherein the azidation reagent is a covalent azide compound selected from the group consisting of halogen azide, $Me_3SiN_3$ and $HN_3$.

29. The process of claim 25, further comprising functionalizing the copolymer with a leaving group or an oxygen containing functional group prior to reacting with said azidation reagent.

30. The process according to claim 29, wherein the copolymer is functionalized with the leaving group.

31. The process according to claim 30, wherein the leaving group is selected from the group consisting of halogen, ether, diazonium, oxonium, nonaflate, inflate, fluorosulfonate, tosylate, mesylate, conjugate acid of an alcohol, conjugate acid of an ether, nitrate, phosphate, $SR'_2$, ester, acid anhydride, amine, $PR_3$, phenoxide, alcohol, carboxylic acid, and mixtures thereof.

32. The process according to claim 30, wherein the leaving group is halogen.

33. The process according to claim 29, wherein the copolymer is functionalized with the oxygen containing group.

34. The process according to claim 33, wherein oxygen containing group is an epoxide.

35. The process according to claim 25, wherein the at least one olefinic monomer is selected from the group consisting of multiolefin monomers, alkyl substituted vinyl aromatic monomers, and combinations thereof.

36. The process according to claim 25, wherein the at least one olefinic monomer comprises at least one multiolefin monomer.

37. The process according to claim 36, wherein the copolymer further comprises repeating units derived from at least one divinyl aromatic monomer.

38. The process according to claim 25, wherein the copolymer comprises repeating units derived from at least one isoolefin, repeating units derived from at least one multiolefin monomer, and repeating units derived from at least one alkyl substituted aromatic vinyl monomer.

39. The process according to claim 25, wherein the process is carried out in solid state or in the presence of a solvent.

40. The process according to claim 25, wherein the process is carried out in the presence of an azidation reagent solubilizing solvent.

41. The process according to claim 40, wherein the contacting comprises adding the copolymer and the azidation reagent to the solvent to form a reaction mixture.

42. The process according to claim 41, further comprising adding an additional solvent to the reaction mixture.

43. The process according to claim 40, wherein the molar ratio of the azidation reagent to the copolymer in the reaction mixture is about 50 to about 0.05.

44. The process according to claim 41, wherein the copolymer is at least about 0.5% by weight of the reaction mixture.

\* \* \* \* \*